Sept. 22, 1959     J. M. SCHUTZ     2,905,220
SELF SEALING PNEUMATIC TIRE

Filed May 13, 1953     2 Sheets-Sheet 1

INVENTOR.
JOSEPH M. SCHUTZ
BY
W. A. Fraser

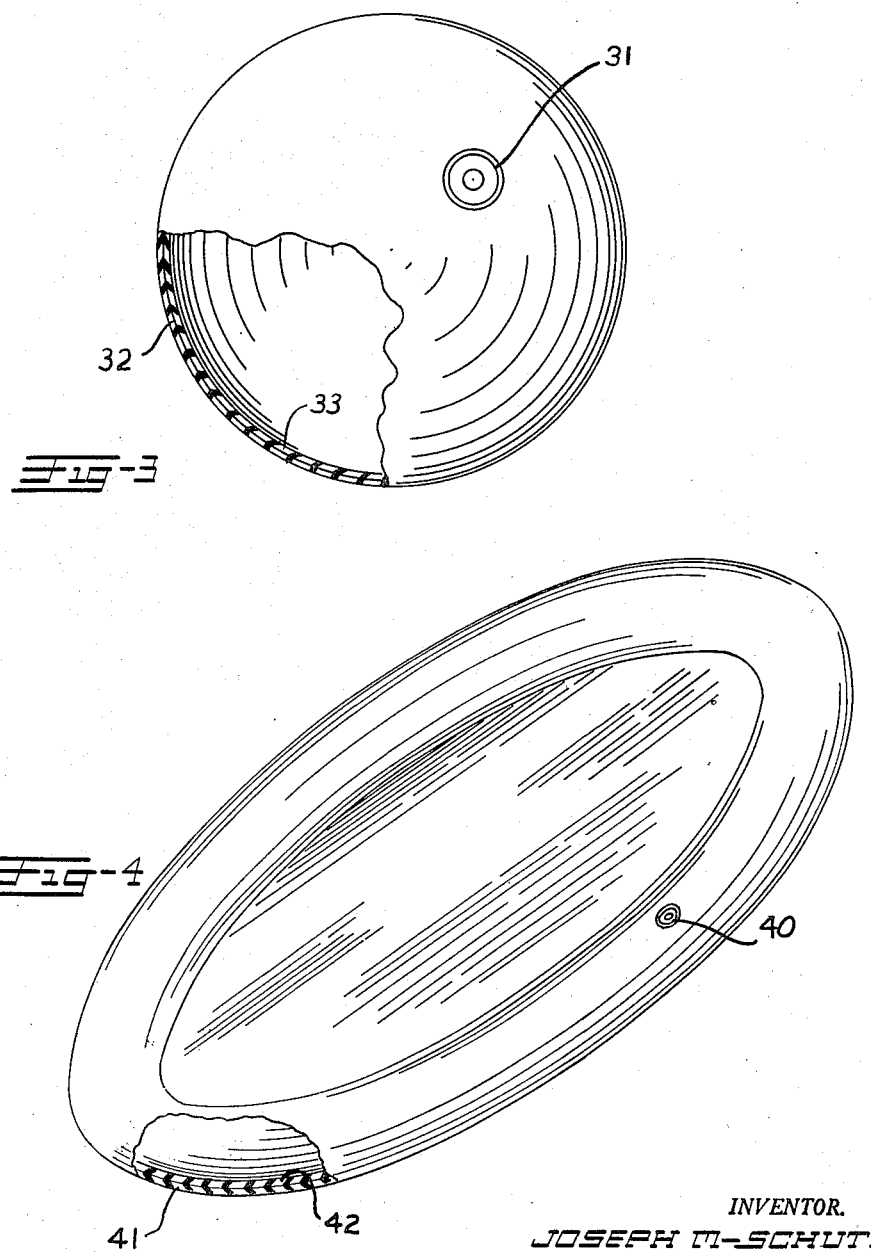

United States Patent Office 2,905,220
Patented Sept. 22, 1959

2,905,220

SELF SEALING PNEUMATIC TIRE

Joseph Michael Schutz, Akron, Ohio, assignor to The Firestone Tire & Rubber Company, Akron, Ohio, a corporation of Ohio Application May 13, 1953, Serial No. 354,753

4 Claims. (Cl. 152—330)

This invention relates to sealing compositions used in puncture-healing articles and more particularly relates to articles such as tire inner tubes and tubeless tires provided internally with an element of puncture healing composition.

The practice has been to provide certain types of tire inner tubes with a layer of a sealing composition in the crown region thereof to heal punctures caused by penetration of pointed objects through the air-retaining wall. Such practice has been continued with the advent of tubeless tires wherein an element of sealing composition is applied on the inside of the air retaining cavity in the crown region of such a tire to provide for puncture healing.

Although natural rubber has been used as the rubber hydrocarbon constituent of the composition of such a sealant, for various reasons it has been unsatisfactory and generally a composition has been adopted comprising a partially vulcanized rubbery copolymer of a major portion of an isoolefin having from 4 to 7 carbon atoms with a minor proportion of an open-chain conjugated diolefin having from 4 to 8 carbon atoms. This copolymer is generally known as "Butyl rubber." "Butyl" rubber compositions although acceptable for a sealant in some respects, in the vulcanized state have very poor adhesion to adjacent tire portions comprised of rubbery compositions other than Butyl rubber unless expensive and complicated steps are taken during manufacture to insure good adhesion. However, even with great care and laborious effort during tire building, difficulty is experienced in obtaining sufficient adhesion between a Butyl sealant and the adjacent tire portions to resist the stress of high centrifugal force during road operation of the tire.

Another problem in the use of Butyl type sealants is that after extended periods of tire operation the sealant surface cracks to produce an undesirable appearance as well as a lack of sealing protection at the cracks.

An object of the present invention, therefore, is to provide a sealing composition which has improved properties of adhesion to the vulcanized rubbery components of a tire in addition to good puncture sealing characteristics.

Yet another object of this invention is to provide a sealing composition which will maintain position in the crown of a tire or in the crown of a tire tube despite the rigorous centrifugal action of rotation at high speed.

A further object of this invention is to provide a puncture healing article comprised of a sealing composition of a copolymer of butadiene and styrene polymerized at relatively low temperatures, and containing an unusually large amount of softener and tackifier.

Yet another object of this invention is to provide a sealing composition for tires or tire tubes with improved crack resistance during tire service.

These and other objects will be more readily understood by reference to the preferred form of the invention shown in the formal drawings wherein:

Figure 3 is a perspective view partially broken away in perspective of an inflatable self-healing article of the invention.

Figure 4 is a perspective view partially broken away in perspective of an inflatable self-healing article of the invention.

An article constructed in accordance with the foregoing objects of the invention contains a sealing element comprised of a copolymer of a major proportion of butadiene and a minor proportion of styrene copolymerized at temperatures below 58° F. and coagulated with a quantity of emulsified softener. Such a copolymer is commonly termed oil extended "cold rubber." While copolymers of butadiene and styrene copolymerized at temperatures of 122° F. are not generally satisfactory as sealant materials, it has been found that such a copolymer coagulated with amounts of softener at temperatures under 58° F. generally form good sealants if properly compounded with unusually large quantities of softener. Polymerization temperatures of 58° F., 41° F., 14° F., 0° F. and —14° F. are particular examples of polymers which have been found satisfactory for the copolymers of the present invention although the invention is not necessarily limited to these temperatures.

Figure 1:
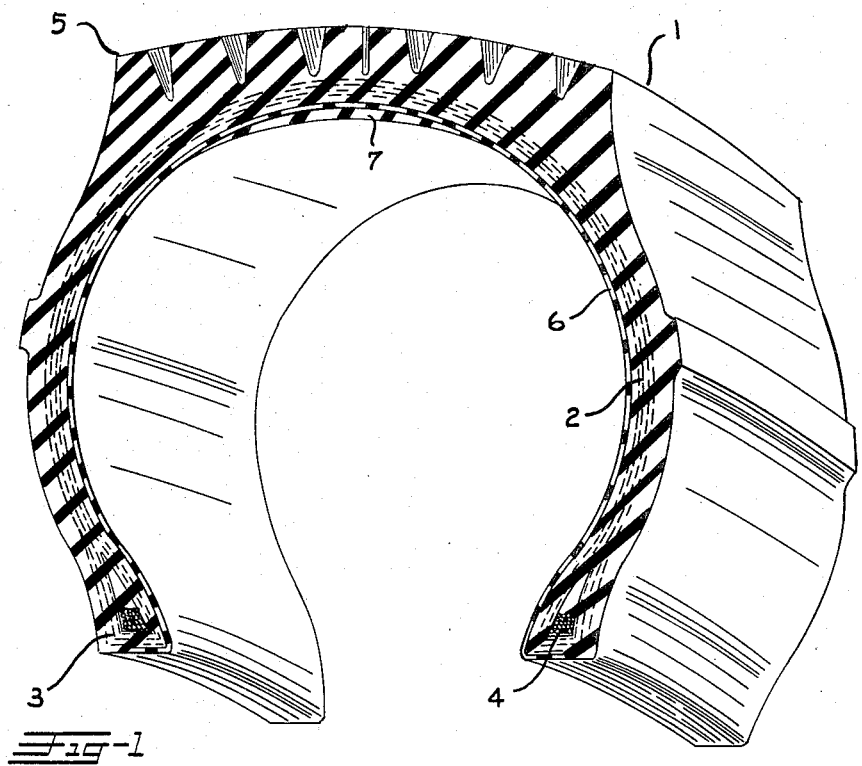
Figure 1 is a sectional view partly in perspective of a tubeless tire employing the invention.

Referring to Figure 1, a tubeless tire generally indicated at 1 is shown comprised of body portion 2, inextensible bead portions 3 and 4 and tread element 5. To provide for retention of air under pressure during operation of the tire on a vehicle, the entire inner surface of the tire which defines the air retaining cavity is lined with a vulcanized rubbery air impervious liner 6. Such liner may be comprised of either natural or synthetic rubber. Sealant 7 covers the liner 6 over that surface thereof which lies in the portion of the tire usually designated as the crown which is essentially adjacent to the road contacting surface of the tread.

Figure 2:
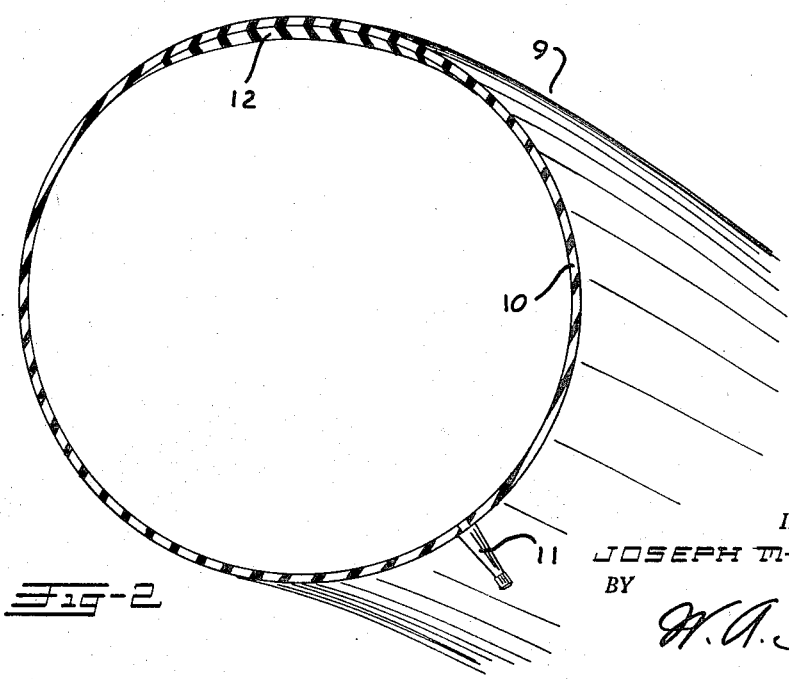
Figure 2 is a sectional view partly in perspective of a puncture proof tube employing the invention.

A puncture proof tube generally indicated at 9 is shown in Figure 2. Such a tube is comprised of an air impervious rubbery wall 10 provided with a valve 11 adapted for inflating the tube with air under pressure. The tube is protected against air loss from punctures by sealant member 12 in the crown comprised of the novel composition to be described hereinafter.

Figure 3 shows an inflatable rubber ball provided with valve 31, flexible wall 32 and sealant layer 33 to heal punctures. Figure 4 illustrates another inflatable article such as a child's rubber swimming pool comprised of inflation valve 40, flexible wall 41 and sealant layer 42 designed to heal punctures.

HOT AND COLD NAIL TEST

To determine the puncture sealing characteristics of the sealant of the invention at different conditions of temperature, a tire is mounted upon a test wheel and run ten miles for warmup. Four 8-penny nails then are hammered into the tire and the test wheel is run 100 miles. The test wheel is dismounted and after 30 minutes two of the nails are pulled from the tire. The tire and wheel assembly is immersed in water to note any air escaping at the punctures. Results of this test are reported as hot air loss results and are indicated as good, fair, or unsatisfactory.

After the hot air loss test, the tire is allowed to cool for 18 hours and the two remaining nails are withdrawn. The tire and wheel assembly is again immersed in water to note any air escaping from the punctures and the results are reported as cold air loss results.

NAILBOARD TEST

A tire provided with a sealant to be tested is mounted on a wheel and driven over a board from which project six 8-penny nails. The tire is then immersed in water to note any loss of air through the nail holes.

In all formulations given below parts are by weight based on 100 parts by weight of copolymer material in the composition.

Example 1

|  | Parts |
|---|---|
| Low temperature polymer | 100.00 |
| Softener [1] in polymer | 25.00 |
| Iron oxide | 37.50 |
| Zinc oxide | 3.75 |
| Softening oil | 49.95 |
| Tackifier and softener | 37.50 |
| Sulfur | .80 |
| Boric acid | .50 |
| Rubber accelerator | .50 |
| Rubber antioxidant | 1.25 |
|  | 256.82 |

[1] Added to copolymer during manufacture.

A sealant composition was mixed on a two-roll mill according to the above formula and then shaped to the desired dimensions to provide a sealing element to fit the crown of the tire. The tire was vulcanized and mounted on a test wheel and the aforementioned nailboard test and nail tests were run with satisfactory results.

Example 2

|  | Parts |
|---|---|
| Low temperature polymer | 100.00 |
| Softener [1] in polymer | 37.50 |
| Iron oxide | 37.00 |
| Zinc oxide | 4.00 |
| Rubber softener | 50.00 |
| Rubber tackifier and softener | 40.00 |
| Sulfur | .80 |
| Boric acid | .50 |
| Rubber Accelerator | .50 |
| Rubber antioxidant | 1.50 |
|  | 271.85 |

[1] Added to copolymer during manufacture.

A sealant composition was mixed on a two-roll mill according to the above formula and shaped to the dimensions to provide a sealing element to fit the crown of a tire. The tire was vulcanized and mounted on a test wheel and the aforementioned nail tests were run with satisfactory results.

Example 3

|  | Parts |
|---|---|
| Low temperature polymer | 100.00 |
| Softener [1] in polymer | 50.00 |
| Iron oxide | 37.00 |
| Zinc oxide | 4.00 |
| Rubber softener | 50.00 |
| Rubber tackifier | 40.00 |
| Sulfur | .80 |
| Boric acid | .50 |
| Rubber Accelerator | .50 |
| Rubber antioxidant | 1.50 |
|  | 284.30 |

[1] Added to copolymer during manufacture.

A sealant composition was mixed on a two-roll mill according to the above formula and shaped to the desired dimensions to provide a sealing element to fit the crown of the tire. The tire was vulcanized and mounted on a car wheel and the aforementioned nail tests were run with satisfactory results.

ENDURANCE TEST

Tubeless tires were built using a sealant composed of the composition of Example 1 over 180° of the inside crown surface by the band ply of each tire. The other 180° of the inside crown surface of the band ply was covered with a sealant composed of a conventional sealing composition comprised of Butyl type rubber. The tires were run on a test wheel underinflated and overloaded for 6500 miles to compare the cracking and blistering characteristics of each sealant. The results as follow show the improved performance of the novel unusually high oil loaded low temperature polymerized butadiene-styrene polymer compound.

|  | Nailboard test | Sealant flow | Nail sealing | Sealant cracking |
|---|---|---|---|---|
| Example 1 | Good | None | Good | None. |
| Example 2 | do | do | do | Do. |
| Example 3 | do | do | do | Do. |
| Control sealant [1] | do | Slight | Fair | Moderate. |

[1] Control sealant is comprised essentially of Butyl rubber.

It is thought that the novel composition attains its puncture sealing characteristics by clinging to the nail protruding through the tire body into the air-containing cavity. As the nail is withdrawn the novel composition is pulled into the hole left by the nail thereby healing the puncture and sealing the air-containing cavity against loss of air.

The above formulae are given only as illustrations and it is to be understood that variations in constituents may be made by those familiar with the art of rubber compounding. For example, accelerator and sulfur variations may be made to obtain an optimum state of vulcanization depending upon the inflatable article being vulcanized as well as upon the heat and time of vulcanization. However, for best puncture-sealing characteristics the sulfur content available for vulcanization should be between .2 and .80 part by weight based upon 100 parts of copolymer.

In place of butadiene in the rubbery copolymer, other open-chain conjugated diolefins may be used such as piperylene, 2,3-dimethyl butadiene-1,3; 3-methyl pentadiene-1,3; 2-methyl pentadiene-1,3; hexadiene-1,3; hexadiene-2,4; isoprene and others. In this invention the use of butadiene-1,3 and styrene are preferred, but not to be deemed as limiting.

Aryl substituted ethylene monomers polymerizable with the diene monomer include styrene, alpha methylstyrene, p-chloro styrene, p-methoxy styrene, vinyl naphthalene and others. In this invention styrene is preferred but is not to be deemed limiting.

The iron oxide content may be varied from 15 to 45 parts by weight on the copolymer depending upon the type of tire in which the sealant is to be used. The iron oxide should be essentially copper free with not over .06% copper present. The FeO content should not be below 23% while the fineness of this oxide should be such that not less than 99% will pass through a sieve rated at 300 mesh to the inch.

Calcium carbonate may be substituted for iron oxide in the same proportions by weight. The calcium carbonate is preferably of a fineness such that 100% will pass through a sieve rated at 100 mesh per inch while at least 99% will pass through a sieve rated at 300 mesh per inch. The moisture content of this material should not exceed .25% by weight. The fine particle size of the iron oxide and calcium carbonate is necessary to provide a sealant with good resistance to cracking.

As will be understood by those working in the art softeners may be used such as those set out by J. D. D'Ianni, J. J. Hoesley and P. S. Greer in an article entitled "Oil Extended Synthetic Rubber Including Oil Master Batched GRS" published in the Rubber Age, June 1951.

The advantages of the sealant of the invention are obtained by the use of a softener content far above that normally used in compounding natural rubber and synthetic rubbery polymers. The following table lists what is generally considered the maximum usable amount of softener for certain synthetic rubber stocks based on parts by weight of copolymer used:

| Stock: | Parts by weight |
|---|---|
| Tire tread stock | 60 |
| Tire body stock | 50 |
| Tire inner tube stock | 30 |
| Butyl inner tube sealant | 60 |

The present invention uses softener loadings in a range above 80 parts by weight based on the rubber hydrocarbon content. The tackifier content also serves to soften the rubber and although listed in the above examples as a "tackifier" also contributes to softening of the final sealant compound. Satisfactory as softeners are petroleum oils, petroleum resins as well as pine oil and the like. Tackifiers available for the invention include synthetic resins such as coumarone-indene resins, ester gum, rosin and other tackifiers offered commercially to the rubber industry.

Several preferred embodiments of the invention have been described in considerable detail but it will be understood that variations and modifications may be effected within the spirit and scope of the invention as defined in the following claims.

I claim:

1. In a closed pneumatic container the combination of an inner, substantially air impervious liner element comprised of natural rubber and adhered to the inner surface of said liner a puncture sealing member comprised of a copolymer of an open chain conjugated diolefin with an aryl substituted ethylene monomer copolymerized at a temperature of 14° F. to 58° F., having at least 25 parts of softener based on 100 parts by weight of copolymer added to the copolymer in the latex stage and at least 55 parts of softener based on 100 parts by weight of copolymer added to the compound after coagulation of the latex.

2. In a pneumatic tire the combination of an inner substantially air impervious liner element comprised of natural rubber and adhered to the inner surface of said liner a puncture sealing member comprised of a copolymer of an open chain conjugated diolefin with an aryl substituted ethylene monomer copolymerized at a temperature of 14° F. to 58° F., having at least 25 parts of softener based on 100 parts by weight of copolymer added to the copolymer in the latex stage and at least 55 parts of softener based on 100 parts by weight of copolymer added to the compound after coagulation of the latex.

3. In a pneumatic tire the combination of an inner substantially air impervious liner element comprised of synthetic rubber and adhered to the inner surface of said liner a puncture sealing member comprised of a copolymer of an open chain conjugated diolefin with an aryl substituted ethylene monomer copolymerized at a temperature of 14° F. to 58° F., having at least 25 parts of softener based on 100 parts by weight of copolymer added to the copolymer in the latex stage and at least 55 parts of softener based on 100 parts by weight of copolymer added to the compound after coagulation of the latex.

4. In a pneumatic tire the combination of an inner substantially air impervious liner element comprised of a vulcanized rubbery polymeric material and adhered to the inner surface of said liner a puncture sealing member comprised of a copolymer of butadiene and styrene copolymerized at a temperature between 14° F. and 58° F. having at least 25 parts of softener based on 100 parts by weight of copolymer added to the copolymer in the latex stage and at least 55 parts of softener based on 100 parts by weight of copolymer added to the compound after coagulation of the latex.

References Cited in the file of this patent

UNITED STATES PATENTS

| 2,406,903 | Rethorst | Sept. 3, 1946 |
| 2,576,968 | Pike et al. | Dec. 4, 1951 |
| 2,587,470 | Herzegh | Feb. 26, 1952 |
| 2,606,884 | Mayfield | Aug. 12, 1952 |
| 2,649,425 | Hulse | Aug. 18, 1953 |
| 2,664,936 | Waber | Jan. 5, 1954 |

OTHER REFERENCES

D'Ianni et al.: Rubber Age; vol. 69, No. 3; June 1951; pp. 317–321.

Rostler: Rubber Age; vol. 69, No. 5; August 1951; pp. 559–577.

Weinstock et al.: Rubber Age; December 1951; pp. 333–338.